Patented Mar. 30, 1937

2,075,106

UNITED STATES PATENT OFFICE 2,075,106

MOISTUREPROOFING COMPOSITION

Charles R. Fordyce, Rochester, N. Y., and Harold F. Robertson, Pittsburgh, Pa., assignors, by mesne assignments, of one-half to Carbide & Carbon Chemicals Corporation, a corporation of New York, and one-half to Eastman Kodak Company, Jersey City, N. J., a corporation of New Jersey No Drawing. Application May 24, 1932, Serial No. 613,332

8 Claims. (Cl. 134—26)

This invention relates to a moistureproofing composition useful in forming composite moistureproof materials which comprise sheets or films composed essentially of cellulose esters of organic acids combined with the new composition which contains vinyl resins, that is, artificial resinous products resulting from the polymerization of certain vinyl compounds.

Sheets or films of organic acid esters of cellulose, such as cellulose acetate, cellulose propionate, cellulose butyrate, and mixed esters, such as cellulose acetate propionate, cellulose acetate butyrate, and cellulose acetate stearate, are known and have been proposed for various applications. The sheets or films of cellulose organic esters have certain limitations, for example, they are not as hard, as chemically resistant, or as resistant to moisture as may be desired for some purposes. Also, these cellulose organic esters have a comparatively narrow range of solubility, therefore it is difficult to incorporate substances therewith which will impart properties to the material to render it practically successful for those applications from which it may be excluded by these limitations.

We have found by experimentation that the above limitations can be largely overcome, and that a new material having advantageous properties can be produced by forming a composite material which comprises sheets or films composed essentially of cellulose organic esters together with one or more surface coatings or laminae of our new moistureproofing composition which contains vinyl resins. This new product may be transparent, translucent, opaque or colored as desired. It may comprise a single sheet or film of cellulose organic ester coated on one or both sides with the vinyl resin-containing composition, or it may be formed by two or more laminae of the cellulose organic ester having interposed laminae of the vinyl resin composition, with or without surface coatings of the composition.

The principal object of our invention is to provide a novel moistureproofing composition containing vinyl resins which is adapted for use in moistureproofing sheets or films composed essentially of cellulose organic esters.

The composition of our invention may be used with any desired cellulose organic ester of the above mentioned group, but we have found it to be particularly suitable for moistureproofing sheets or films of cellulose acetate of the acetone-soluble type. The cellulose organic ester forming the base sheet or film may contain various plasticizing or modifying agents. Examples of such additional materials are chlorinated naphthalene derivatives, triphenyl esters and tricresyl esters, such as triphenyl and tricresyl phosphates, phthalic acid esters of the lower aliphatic alcohols, and related compounds.

Vinyl resins suitable for use in our new compositions may be formed from vinyl esters by known polymerization processes. The polymerization products of inorganic vinyl esters, such as the vinyl halides, or those of organic vinyl esters, for example vinyl esters of aliphatic acids, may be used. Vinyl resins resulting from the conjoint polymerization (by which is meant polymerization of a plurality of compounds while in mutual contact) of two or more vinyl esters are preferred. For example, vinyl resins having desirable properties may be prepared by the conjoint polymerization of a vinyl halide and a vinyl ester of an aliphatic acid. Products of the conjoint polymerization of vinyl chloride and vinyl acetate in proportions ranging from about 70% to 90% by weight of the chloride are particularly desirable. These preferred vinyl resins may be prepared by causing a mixture of vinyl chloride and vinyl acetate containing, for example, 80% by weight of vinyl chloride, to be polymerized in the presence of a suitable liquid medium, such as the aliphatic alcohols, ketones, and paraffin hydrocarbons, and in the presence of a suitable polymerizing catalyst, such as dibenzoyl peroxide, at a temperature below about 60° C. Vinyl resins and their production are not a part of our invention.

The above-described preferred vinyl resins are substantially water-white and transparent, and they are chemically and electrically inert. These resins are resistant to acids, alkalies and salts, and they are not affected by water or common liquids, such as alcohol and gasoline. Surfaces composed of vinyl resins are hard and brilliant, and not easily marred by abrasion. These resins are uniformly tough and flexible, and films thereof possess good mechanical strength. The vinyl resins are miscible with many modifying materials, such as waxes, gums, other resins, plasticizers, and the like. In addition, the properties of the preferred vinyl resins are retained to large extent when these resins are modified by the addition of a second resin, a gum, a wax, or a plasticizing material. For this reason the vinyl resins can be modified to meet specific requirements without materially altering the properties of the resins which are desirable in the new composite materials.

In practicing our invention many modifications are possible. The new composition may comprise a solution containing 5% to 25% by weight of solids dissolved in a solvent which is substantially a non-solvent for cellulose organic esters, but which possesses some solvent or softening power for the cellulose organic ester of the base sheet with which the composition is to be combined. The composition preferably contains ingredients other than vinyl resins to alter its characteristics, all as more fully hereinafter described. The composition may be applied to the cellulose organic ester in any convenient manner, and the solvent is then removed by drying.

In general, the moistureproofing qualities of the composition are improved, and its other characteristics may be varied by including various modifying agents and combinations thereof in the compositions. For example, waxes, gums, other resins, plasticizers and other ingredients as well as the vinyl resins may be included in the compositions. The appearance of the moistureproofed product may be enhanced by including coloring materials, particularly oil-soluble dyes, in the compositions.

A variety of solvents may be used in the new composition. The solvent must be capable of dissolving all of the ingredients of the moistureproofing composition but must be substantially a non-solvent for cellulose organic esters, that is, it should not attack the base sheet or film to an extent which will cause the sheet or film to stretch or to become weakened or deformed. In most cases mixed solvents are preferred which include a small amount, say 5% to 10% by volume, of a solvent or softening agent for cellulose organic esters. A solvent for cellulose organic esters which has a rate of evaporation slower than that of the balance of the solvent mixture is preferable since this allows the interface between the base sheet or film and the moistureproofing composition to remain soft until the composition is nearly dried. Toluene, butyl acetate, ethylene dichloride and propylene dichloride are examples of solvents from which suitable solvent mixtures may be prepared. Compositions containing propylene dichloride are specifically disclaimed as part of our invention, such compositions having been invented by Leonard E. Branchen, and described and claimed by him in Patent 2,034,020. As a solvent or softening agent for cellulose organic esters to be used in the compositions beta-butoxyethyl alcohol is preferred and has been found to be particularly efficacious in producing smooth adherent overcoatings in the final product. Other softening agents or solvents for cellulose organic esters may be used in place of beta-butoxyethyl alcohol, for instance, the monoethyl or monobutyl ethers of diethylene glycol, the acetates of beta-ethoxyethyl alcohol or beta-butoxyethyl alcohol, or equivalent substances may be used.

The dissolved solids in the composition may comprise up to about 45% by weight of wax, up to about 20% by weight of gum or resin, and up to about 25% by weight of plasticizer, the balance being principally vinyl resin.

Suitable waxes are paraffin wax, ceresin wax, Japan wax, spermaceti wax, waxlike derivatives of chlorinated naphthalene, and carnauba wax. The wax to be used and its proportion in the composition is determined by its compatibility with the vinyl resin and other ingredients of the composition, and by its moisture resistant qualities. We prefer to use a high melting paraffin wax, i. e. one melting above about 50° C., or those waxes which contain the higher paraffin hydrocarbons, such as ceresin wax. In the case of paraffin or ceresin wax the amount to be used in the composition is preferably between about 2% and 10% based on the weight of solids in the composition, whereas with chlorinated naphthalene waxes the proportion may be as great as 45% by weight of the solids.

The gum used must be a gum that is compatible with vinyl resins and the other components of the composition. Ester gum and various modifications thereof and certain phenol-formaldehyde resins, particularly those of the oil-soluble type, are examples of suitable gums or resins. We prefer to use ester gums in our compositions, and we have found that the compatibility of many of these gums and other gums or resins may be increased without altering their solubility or water resistance by oxidizing them. The oxidized gums and resins may be prepared by passing air through a solution of the gum or resin in a non-oxidizable solvent, or by merely exposing the solid material to air oxidation.

The use of plasticizing material is optional, but in most cases the flexibility, resilience and strength of the product are improved by the use of plasticizers for the vinyl resins. It is desirable to use plasticizers which are mutually compatible with vinyl resins and with the organic cellulose ester of the base material but this is not essential. Such a plasticizer generally improves the adhesion of the moistureproofing composition to the cellulose ester film. Typical satisfactory plasticizers are di(beta-butoxyethyl) phthalate, the diesters of ethylene and diethylene glycol mono-alkyl ethers and phthalic acid, phthalic acid esters of the lower aliphatic alcohols, and related compounds.

Substances other than those discussed may be added to the composition to produce certain specific effects. For example, anthracene or phenanthrene may be added to increase the brilliancy and lustre of the coating in the final product.

The moistureproofing composition may be applied to the cellulose organic ester sheet or film by any convenient method, such as by dipping the sheet, spraying the composition on the sheet, coating the sheet with a wheel which carries the composition, or by other means. In this connection, we have discovered an unexpected phenomenon, viz, that a film of a cellulose organic ester which has been coated with a vinyl resin composition by a spraying operation is less effectively moistureproofed than when the same composition is applied by a dipping operation, even though the sprayed coating is thicker.

The coating may be applied to any convenient temperature, ordinarily at room temperature, or about 20° C. The temperature at which the coating is applied may vary over a considerable range dependent upon the moistureproofing composition being used and other factors. For example, in the case of compositions containing propylene dichloride, temperatures, at least below about 50° C. should be employed since propylene dichloride begins to attack cellulose organic esters at higher temperatures.

The coated product may be dried in any convenient manner, and a wide range of temperatures may be employed. The drying temperature will vary according to the various conditions employed, and may range from about 50° to 110° C.

We prefer to apply the coating by passing the sheet or film to be coated through the moistureproofing composition, and to eliminate the solvent and dry the product in a continuous drying tower or similar device. The speed at which the films may be coated is dependent upon the concentration of solids in the coating composition, the method and temperature of drying the film, and other factors. In general, speeds ranging from about 20 to 35 feet per minute are satisfactory using compositions ranging from about 5% to 10% solids, and a drying temperature of about 90° to 110° C.

Inasmuch as it may be desirable to obtain the properties of the new product in a product which has outer surfaces of cellulose organic esters, it is sometimes desirable to vary the product by placing two films of cellulose organic esters together with a lamina of our moistureproofing composition therebetween. In this case our vinyl resin composition serves to reduce the rate of moisture transmission through the laminated product, and as a cement for the laminae of cellulose organic esters.

The following examples are illustrative of the invention. These examples describe the formation of our new product with cellulose acetate, but it is understood that the invention is not limited thereto. Other cellulose organic esters may be substituted for cellulose acetate directly, or with slight changes in the solvent mixtures used. For example, cellulose acetate propionate or cellulose acetate butyrate may be substituted directly for cellulose acetate in the following examples. In the case of cellulose propionate and cellulose butyrate, the only change required would be in the solvent composition which, for these esters, should consist of at least 80% toluene. Cellulose acetate stearate containing not more than about 20% stearyl may be used if the solvent does not contain more than about 20% of toluene and contained no other solvents which actively attack this ester.

In all of the examples, the proportions of the solid components of the compositions will be given as percent by weight of the total solids, the solids in the composition will be expressed as weight percent of the entire composition, and the solvent mixtures will be described in terms of percent by volume.

I. Cellulose acetate films were coated with solutions of vinyl chloride resin and wax-like derivatives of chlorinated naphthalene. The coatings produced in each case were about 0.0001 inch in thickness. The compositions contained 7% solids dissolved in a mixture of 1 volume of beta-butoxyethyl alcohol to 10 volumes of butyl acetate. The table shows the proportions of vinyl resin and wax in the compositions, and the rate of moisture transmission through the coated product in milligrams per square centimeter per hour.

| Vinyl chloride resin | Wax | Rate of moisture transmission |
|---|---|---|
| Percent | Percent | |
| 90.0 | 10.0 | 0.33 |
| 83.3 | 16.7 | 0.38 |
| 71.4 | 28.6 | 0.27 |
| 55.0 | 45.0 | 0.25 |

The rate of moisture transmission through the uncoated films of cellulose acetate was 1.40 milligrams per square centimeter per hour.

II. Compositions were prepared containing vinyl chloride resin, ceresin wax, and di(beta-butoxyethyl) phthalate as a plasticizer. The addition of the plasticizer improved the adhesion of the coating to the base. The compositions consisted of 5% solids in a solvent composed of 47.5% toluene, 47.5% ethylene dichloride, and 5% beta-butoxyethyl alcohol. The data are tabulated below.

| Vinyl chloride resin | Ceresin wax | Di (beta-butoxyethyl) phthalate | Moisture transmission mg./sq.cm./hr. |
|---|---|---|---|
| Percent | Percent | Percent | |
| 80 | 10 | 10 | 0.54 |
| 70 | 20 | 10 | 0.23 |

The coatings produced from these compositions increased the thickness of the cellulose acetate films about 0.0001 inch. The uncoated film transmitted moisture at the rate of 1.40 mg./sq. cm./hr.

III. A composition was prepared which consisted of:

| | Per cent |
|---|---|
| Vinyl resin | 73 |
| Oxidized ester gum | 5 |
| Di(beta-butoxyethyl) phthalate | 20 |
| Paraffin wax | 2 |

The vinyl resin was a resin formed by the conjoint polymerization of 80% by weight of vinyl chloride and 20% by weight of vinyl acetate.

These solids were dissolved in a mixture of 50% butyl acetate and 50% toluene to form a solution containing 20% solids.

Through this solution was drawn a film of cellulose acetate 0.001 inch in thickness. The film was then passed through a vertical drying tower at 70° C. The coated film was 0.0012 inch in thickness, clear in appearance, and the coating adhered well to the film. The rate of moisture transmission through the original film was 1.44 milligrams per square centimeter per hour, and through the film after coating was 0.004 milligram per square centimeter per hour.

IV. A composition was made up as follows:

| | Per cent |
|---|---|
| Vinyl resin | 72.5 |
| Di(diethylene glycol monobutyl ether) phthalate | 20.0 |
| Oxidized ester gum | 5.0 |
| Paraffin wax | 2.5 |

The vinyl resin used was identical with that of Example III. These solids were made up to a 20% to 50% solution in a mixture of 50% butyl acetate and 50% toluene.

This composition was applied to one side of each of two sheets of cellulose acetate. When the composition was nearly dry, the sheets were placed together and hot-pressed until the composition was entirely freed of solvent. The laminated product was 0.0017 inch in thickness, of which the moistureproofing lamina was 0.0001 inch. The product was clear, and possessed good flexibility and adherence. The laminated sheet transmitted moisture at the rate of 1.5 milligrams per square centimeter per hour, while the original cellulose acetate sheets had a rate of moisture transmission equal to about 3.5 milligrams per square centimeter per hour.

V. A composition as in Example IV was made up to 20% solids in a mixture of 50% toluene and 50% butyl acetate. To each of four portions of this solution was added 0.5% of an oil-soluble dye. The compositions were then applied to sheets of cellulose acetate 0.0008 inch in thickness to form colored moisture proofed sheets 0.001 inch in thickness. The coated sheets were clear, flexible, and the coatings adhered to the cellulose acetate. The moisture resistance is shown by the following table of moisture transmission:

|  | Milligrams/sq. cm./hr. |
|---|---|
| Green dye | 0.0041 |
| Blue dye | 0.0032 |
| Orange dye | 0.0028 |
| Yellow dye | 0.0018 |
| Uncoated cellulose acetate sheet | 3.0–3.5 |

VI. A composition was prepared as follows:

|  | Per cent |
|---|---|
| Vinyl resin | 76 |
| Paraffin wax | 2 |
| Di(diethylene glycol monobutyl ether) phthalate | 17 |
| Anthracene | 5 |

The vinyl resin was identical with that of Example III. This composition was made up to 10% solids in a mixture of 50% butyl acetate and toluene. A film of cellulose acetate 0.0009 inch in thickness was coated with this composition and dried. The product was 0.0012 inch in thickness, and was exceptionally clear and brilliant. The rate of moisture transmission through the coated film was 0.012 milligram per square centimeter per hour.

VII. The following are examples of related compositions illustrating a preferred range of the ingredients which is, in general, about 55% to 85% of vinyl resin, about 2% to 10% of paraffin wax, about 5% to 20% of gum, and about 0% to 15% of plasticizer.

| Component | 1 | 2 | 3 | 4 |
|---|---|---|---|---|
|  | Percent | Percent | Percent | Percent |
| Vinyl resin | 77 | 71 | 77 | 70 |
| Oxidized ester gum | 10 | 15 | 10 | 15 |
| Di(beta-butoxyethyl) phthalate | 10 | 9 | 5.5 | 5 |
| Paraffin wax (M. P. 66° C.) | 3 | 5 | 7.5 | 10 |

| Component | 1 | 2 | 3 | 4 |
|---|---|---|---|---|
| In | 7.5% Solids | 6% Solids | 7% Solids | 6% Solids |
| Toluene | 65% | 75% | 75% | 75% |
| Ethylene dichloride | 35% | 15% | 15% | 15% |
| Beta-butoxyethyl alcohol |  | 10% | 10% | 10% |

In each case the rate of moisture transmission through the uncoated film was 1.40 mg./sq. cm./hr. which was reduced to 0.014 mg./sq. cm./hr. for the coated films. The vinyl resin used in these compositions was one resulting from the conjoint polymerization of vinyl chloride and vinyl acetate in the proportions of about 80% by weight of the chloride.

We claim:—

1. A moistureproofing composition for sheets or films composed essentially of cellulose acetate which comprises a substantial proportion of a vinyl resin resulting from the conjoint polymerization of vinyl chloride and vinyl acetate, a paraffin wax melting above about 50° C., oxidized ester gum and di(beta-butoxyethyl) phthalate dissolved in a liquid which is substantially a non-solvent for cellulose acetate and which contains a minor proportion of beta-butoxyethyl alcohol.

2. A moistureproofing composition for sheets or films composed essentially of organic acid esters of cellulose which comprises about 55% to 85% by weight of a vinyl resin resulting from the conjoint polymerization of vinyl chloride and vinyl acetate in the proportions of about 70% to 90% by weight of vinyl chloride, about 2% to 10% by weight of a paraffin wax melting above about 50° C., about 5% to 20% by weight of a gum, and up to about 15% of plasticizing material dissolved in a liquid which is substantially a non-solvent for cellulose organic esters and which contains less than about 10% by volume of beta-butoxyethyl alcohol.

3. A moistureproofing composition for sheets or films composed essentially of organic acid esters of cellulose which comprises about 55% to 85% by weight of a vinyl resin resulting from the conjoint polymerization of vinyl chloride and vinyl acetate in the proportions of about 70% to 90% by weight of vinyl chloride, about 2% to 10% by weight of a paraffin wax melting above about 50° C., about 5% to 20% by weight of oxidized ester gum, and up to about 15% of di(beta-butoxyethyl) phthalate dissolved in a liquid which is substantially a non-solvent for cellulose organic esters and which contains less than about 10% by volume of a softening agent for organic acid esters of cellulose which has a slower rate of evaporation than the balance of said liquid.

4. A moistureproofing composition for sheets or films composed essentially of organic acid esters of cellulose which comprises about 55% to 85% by weight of a vinyl resin resulting from the conjoint polymerization of vinyl chloride and vinyl acetate in the proportions of about 70% to 90% by weight of vinyl chloride, about 2% to 10% by weight of a paraffin wax melting above about 50° C., about 5% to 20% by weight of oxidized ester gum, and up to about 15% of di(beta-butoxyethyl) phthalate dissolved in a liquid which is substantially a non-solvent for organic acid esters of cellulose and which contains less than about 10% by volume of beta-butoxyethyl alcohol.

5. A moistureproofing composition for sheets or films composed essentially of cellulose acetate which comprises about 55% to 85% by weight of a vinyl resin resulting from the conjoint polymerization of vinyl chloride and vinyl acetate in the proportions of about 80% by weight of vinyl chloride, about 2% to 10% by weight of paraffin wax melting above about 60° C., about 5% to 20% by weight of oxidized ester gum, and up to about 15% by weight of di(beta-butoxyethyl) phthalate dissolved in a liquid comprising at least about 65% by volume toluene, from about 15% to 35% by volume ethylene dichloride, and less than about 10% by volume beta-butoxyethyl alcohol, the total solids in said composition being about 5% to 10% by weight of the total composition.

6. An article of manufacture comprising at least one sheet or film composed essentially of cellulose acetate combined with a relatively thin layer of a moistureproofing composition adapted to produce a strong, flexible, adherent film on materials coated therewith, said composition containing about 55% to 85% by weight of a vinyl resin substantially identical with a vinyl resin resulting from the conjoint polymerization of vinyl chloride and vinyl acetate, about 2% to 10% by weight of a high melting paraffin wax, about 5% to 20% by weight of a gum, and from about 5% to about 15% by weight of di(beta-butoxyethyl) phthalate.

7. An article of manufacture which comprises a sheet or film composed essentially of cellulose acetate combined with a moistureproofing composition comprising about 55% to 85% by weight of a vinyl resin substantially identical with a vinyl resin resulting from the conjoint polymerization of about 80% by weight of vinyl chloride and about 20% by weight of vinyl acetate, about 2% to 10% by weight of a paraffin wax melting above about 50° C., about 5% to 20% by weight of oxidized ester gum, and up to about 15% by weight of di(beta-butoxyethyl) phthalate.

8. Process for rendering sheets or films composed essentially of cellulose acetate impervious to moisture which comprises applying to said sheets or films a moistureproofing composition containing about 55% to 85% by weight of a vinyl resin substantially identical with a vinyl resin resulting from the conjoint polymerization of about 80% by weight of vinyl chloride and about 20% by weight of vinyl acetate, about 2% to 10% by weight of paraffin wax melting above about 50° C., about 5% to 20% by weight of oxidized ester gum, and up to about 15% by weight of di(beta-butoxyethyl) phthalate dissolved in a volatile liquid which is substantially a non-solvent for cellulose acetate, and thereafter removing the liquid from the moistureproofing composition.

CHARLES R. FORDYCE.
HAROLD F. ROBERTSON.